Sept. 16, 1969  H. K. SCHMIDT ET AL  3,467,450

ECCENTRICALLY ADJUSTABLE ROLLER

Filed Dec. 14, 1967

INVENTORS.
HENRY K. SCHMIDT
SIEGFRIED BEIMFOHR

BY Paul & Paul

ATTORNEYS.

United States Patent Office 3,467,450
Patented Sept. 16, 1969

3,467,450
ECCENTRICALLY ADJUSTABLE ROLLER
Henry K. Schmidt, Levittown, and Siegfried Beimfohr, Morrisville, Pa., assignors to Roller Bearing Company of America, West Trenton, N.J., a corporation of New Jersey
Filed Dec. 14, 1967, Ser. No. 690,652
Int. Cl. F16c 13/02, 35/04, 23/06
U.S. Cl. 308—15                                    8 Claims

ABSTRACT OF THE DISCLOSURE

An eccentrically adjustable flush-mounted load-bearing roller is disclosed. The roller comprises an annular steel outer race, an annular steel inner race and bearing means therebetween. The inner race has an enlarged bore at one end, and at the other end, in the preferred form, has an integral conical axial projection which extends beyond the outer race and is received in a correspondingly tapered or conical portion at one end of the off-center bore of a split flanged eccentric bushing which is set into a through countersunk hole in the mounting plate. The bore at the other end of the eccentric bushing is cylindrical and threaded. A flush-mounted socket-head cap screw secures the inner race to the bushing, the head of the screw being received into the enlarged bore of the inner race. Nothing projects from the mounting plate on the other side from the roller, the flanged eccentric bushing being received fully by the countersunk hole in the mounting plate. Adjustment of the position of the roller is made by rotating the eccentric bushing.

FIELD OF THE INVENTION

This invention relates to eccentrically adjustable load-bearing rollers and to the method and means of mounting them. More particularly, this invention relates to all types of adjustable side-thrust rollers for lift-truck carriages and masts, roller-followers and cam followers running on flat or cam-shaped tracks, giving a provision to take any clearance and/or to avoid any interference between the roller circumference and the track-way caused by inaccuracies in manufacture or structural distortion.

DESCRIPTION OF THE PRIOR ART

In the prior art, eccentrically adjustable load-bearing rollers are mounted on eccentrically mounted shafts which project from the mounting plate on the side opposite the roller and are secured as by nuts. Such projections are objectionable, at least in some cases.

SUMMARY OF THE INVENTION

In accordance with the present invention, the load-bearing roller is provided with an inner race having a tapered or conical projection which projects axially beyond the outer race and is received by the correspondingly tapered off-center bore of an internally-threaded split flanged bushing flush mounted in the mounting plate. A socket-head cap screw, flush mounted in the inner race, secures the roller to the bushing. The cap screw is lightly tightened during adjustment of the eccentric bushing. Following adjustment the cap screw is fully tightened to expand the split bushing radially and to tightly wedge and lock it against rotation and axial movement in the mounting plate.

DESCRIPTION OF THE PREFERRED EMBODIMENT

Figure 2:
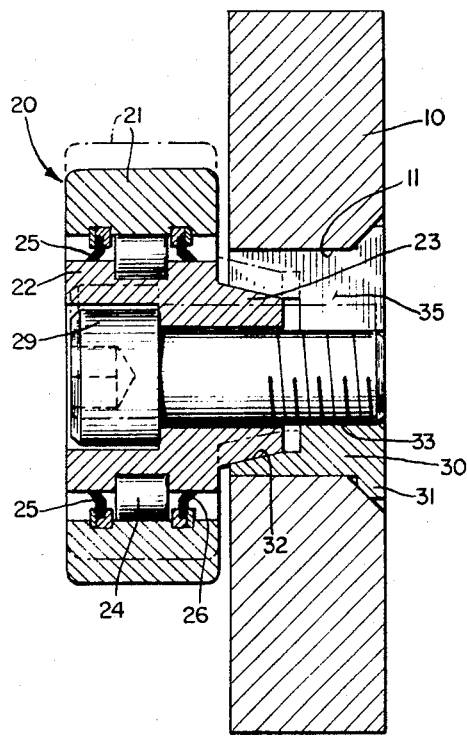
FIG. 2 is a view in section, looking along the line II—II of FIG. 1.
Figure 1:
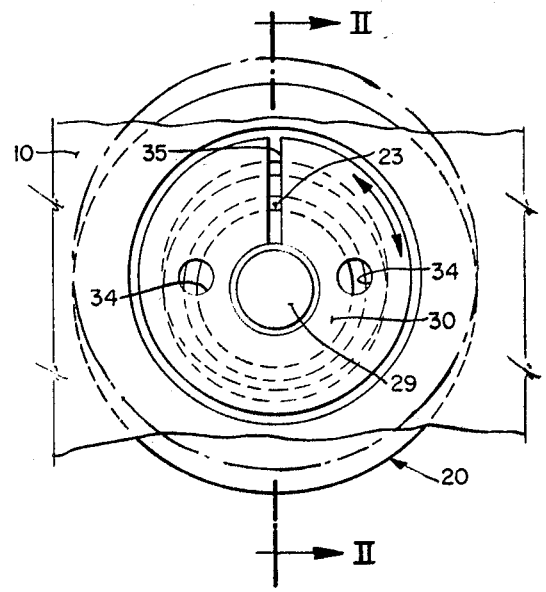
FIG. 1 is an end view of the flush-mounted eccentric bushing looking axially toward the roller.
Figure 3:
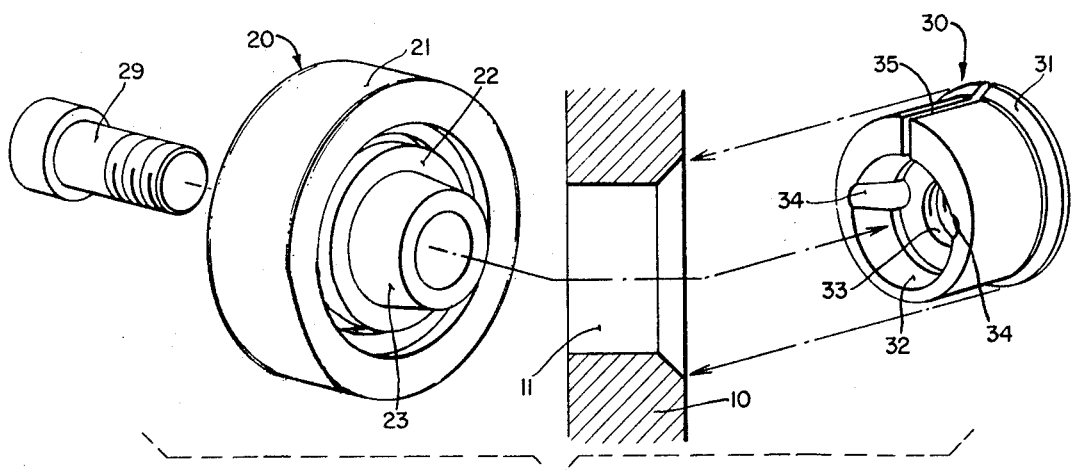
FIG. 3 is an exploded perspective view showing, from left to right, the cap screw, the roller, the mounting plate, and the split eccentric bushing.

In the drawing, the load-bearing roller 20 is shown to comprise an annular outer race 21, an annular inner race 22, the rolling elements 24, and the seals 25 and 26. The races and rolling elements are of hardened steel. The inner race 22 is provided at one end with an enlarged bore forming a recess for receiving the head of a socket-head cap screw 29, and is provided at the other end with an integral tapered or conical axial projection 23 which projects beyond the outer race 21 and is received by the correspondingly tapered recess or conical end portion 32 of the off-center bore of a split eccentric bushing 30. The remaining portion 33 of the bore of the bushing 30 is threaded for receiving the threaded end of the cap screw 29. Alternatively, in lieu of threading the bore of eccentric bushing 30, the bore could be enlarged at the right end as viewed in FIG. 2 to form a recess for receiving a nut.

The eccentric bushing 30 is provided at one end with a conical flange 31. The unexpanded shank of the split bushing has a diameter which adapts it to be slip-fitted into the countersunk hole 11 in the steel mounting plate 10.

The split in the eccentric bushing 30 is provided by a radial slot 35 which extends between its outer periphery and its bore. Thus, when the cap screw 29 is inserted into the inner race 22 and tightened fully into the threaded bore of the bushing 30, the conical portion 23 of the inner race expands the split bushing 30 radially outwardly, so that it assumes a tight interference fit in the plate 10, and prevents rotation and axial movement therein. Thus, the bushing 30 is locked against movement or displacement in an axial direction. The large diameter of the conical portion 23 is greater than the large diameter of the conical recess 32 so that the conical portion 23 does not enter fully into the recess 32. Thus, a clearance or spacing is maintained between the outer race 21 and the face of the plate 10, and, thus, the outer race 21 remains free to rotate.

It is apparent that since the bore in the bushing 30 is off center, the position of the load-bearing roller 20 may be adjusted by angular or rotational adjustment of the bushing 30. For this purpose, the bushing 30 is provided with a pair of adjustment holes 34. These holes 34 preferably extend through the bushing 30, from the flanged end all the way to the conical recess 32, so that when adjustment is to be made, and after the cap screw 29 has been loosened, a punch or similar knock-out tool may be inserted into the holes 34 and used to break the tight wedge between the bushing and the conical portion 23 of the inner race. Holes 34 are also for receiving a spanner tool for rotating the bushing 30 to the desired angular position, and also for maintaining this position while the cap screw 29 is tightened.

When the bushing 30 is adjusted, the roller 20 moves along an arcuate path. The lower limit position of the roller 20 is indicated, in FIG. 2, by the solid line representation; the upper limit position is shown in dot-and-dash lines.

In the preferred form, the conical projection 23 is an integral part of the inner race 22. However, the conical projection could be a separate piece insertable into the wedge-shaped opening of bushing 30 and wedged thereinto when the cap screw 29 is tightened. However, this form would not be as desirable in that the shank of cap screw 29 would then have to take the entire shear load.

While the preferred embodiment of this invention has been described in some detail, it will be obvious to one skilled in the art that various modifications may be made without departing from the invention as hereinafter claimed. For example, the cap screw 29 could be turned around. That is, the head of the cap screw 29 could be in a recess in the eccentric bushing 30 and the inner race 22 could have a threaded bore to receive the threaded end of the cap screw.

What is claimed is:

1. An eccentrically adjustable roller assembly adapted to be supported in a support plate and comprising:
    (a) a roller having:
        an outer race,
        an inner race having a conical axial portion projecting beyond the outer race,
        bearing means between said inner and outer races,
    (b) a rotatably adjustable eccentric bushing for setting into said support plate and having:
        an off-center bore,
        the end of said bore facing said roller being conical for receiving the conical projection on said inner race, and
    (c) a cap screw received by said inner race and by the bore of said bushing for securing said roller to said bushing.

2. A roller assembly according to claim 1 characterized in that the end of said eccentric bushing remote from said roller is threaded for receiving said cap screw.

3. A roller assembly according to claim 2 characterized in that said bushing is slotted to allow for radial expansion of the bushing.

4. A roller assembly according to claim 3 characterized in that said bushing has a flange at the one end remote from said roller.

5. A roller assembly according to claim 4 characterized in that the flange of said bushing is conical and adapted to be received by a countersunk hole in said support plate to provide flush mounting of said bushing in said plate.

6. A roller assembly according to claim 5 characterized in that said bushing at the flanged end is provided with openings for receiving a spanner tool for adjusting the angular position of said bushing.

7. A roller assembly according to claim 6 characterized in that said openings extend through said bushing into communication with the conical portion of the off-center bore, to provide access for insertion of a knock-out punch.

8. A roller assembly according to claim 7 characterized in that the bore of said inner race is enlarged at the end remote from said conical projection for receiving the head of said screw.

References Cited

UNITED STATES PATENTS

| | | | |
|---|---|---|---|
| 493,499 | 2/1893 | Hey | 308—62 |
| 2,926,968 | 3/1960 | Toth | 308—18 XR |
| 2,985,491 | 5/1961 | Hayes | 308—3.8 |
| 3,408,120 | 10/1968 | Goodacre | 308—15 |

KENNETH W. SPRAGUE, Primary Examiner

U.S. Cl. X.R.

308—62, 203